United States Patent [19]

Truninger

[11] Patent Number: 4,469,191

[45] Date of Patent: Sep. 4, 1984

[54] CHASSIS WITH SWIVEL-MOUNTED WHEEL AXLES, ESPECIALLY FOR MOBILE CRANES

[75] Inventor: Thomas Truninger, Zurich, Switzerland

[73] Assignee: Adna Aktiengesellschaft, Vaduz, Liechtenstein

[21] Appl. No.: 421,512

[22] Filed: Sep. 22, 1982

[30] Foreign Application Priority Data

Oct. 21, 1981 [CH] Switzerland ......................... 6720/81

[51] Int. Cl.[3] ............................................. B60K 17/34

[52] U.S. Cl. .................................... 180/233; 180/242; 212/189

[58] Field of Search ........................ 180/233, 242, 199; 280/763.1; 212/189

[56] References Cited

U.S. PATENT DOCUMENTS 1,929,342 10/1933 Zesewitz ......................... 180/199 X 2,752,056 6/1956 Lull ................................ 212/189 X

*Primary Examiner*—John A. Pekar

*Attorney, Agent, or Firm*—Watson, Cole, Grindle & Watson

[57] ABSTRACT

Each of the swivel-mounted wheel axles of a chassis can be manually positioned by means of an adjusting device, which includes a lever, into a first position for driving the chassis straight ahead or in reverse with respect to its longitudinal dimension, or else into a second position for turning the chassis about a fixed spot. In each position, the swivel-mounted axle is fixed in this position by means of a locking pin, which can be brought into the locked position by raising the lever or into the disengaged position by lowering the lever. A locking detector is assigned to each position. The locking detectors which have been assigned to the setting for driving straight or to that for turning on the spot are each incorporated into a separate control circuit, these control circuits permitting the starting of the wheel drives only when the swivel-mounted wheel axles have been properly set and locked for either driving straight or turning about the fixed spot.

17 Claims, 8 Drawing Figures

Fig.1
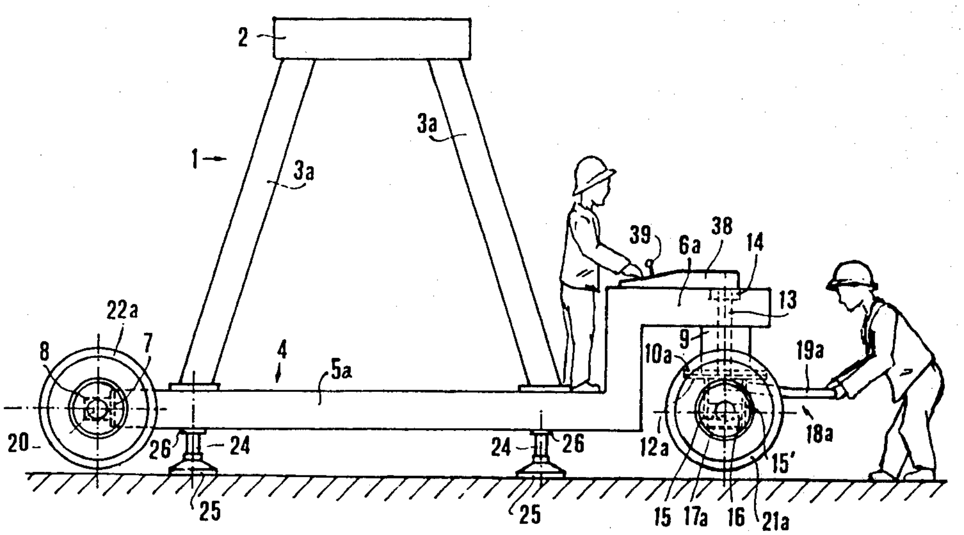
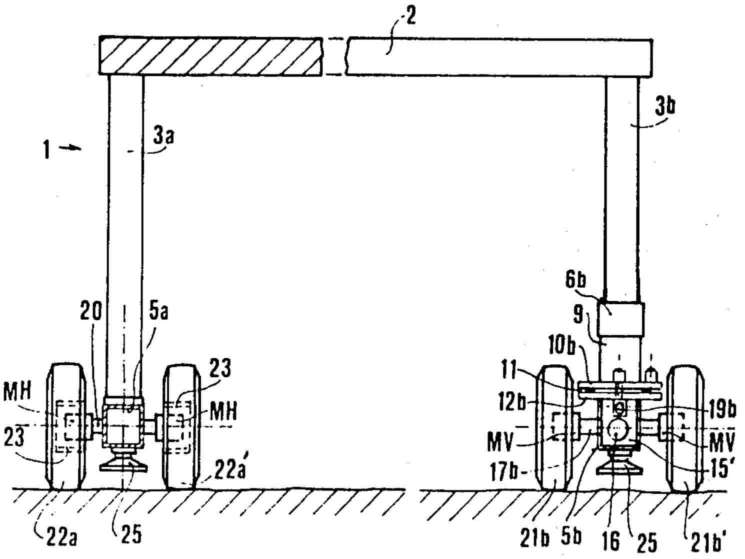
Fig.2

Fig.5
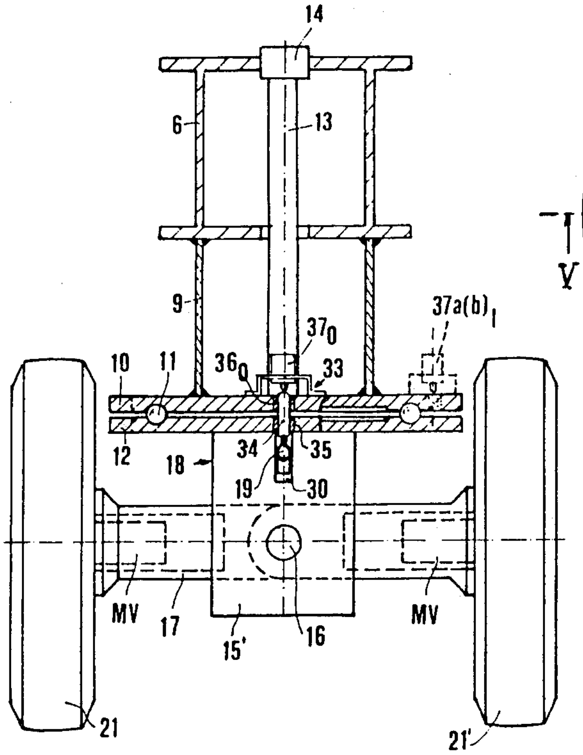
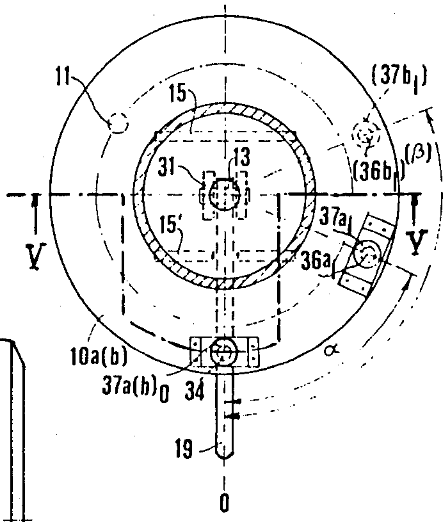
Fig.6
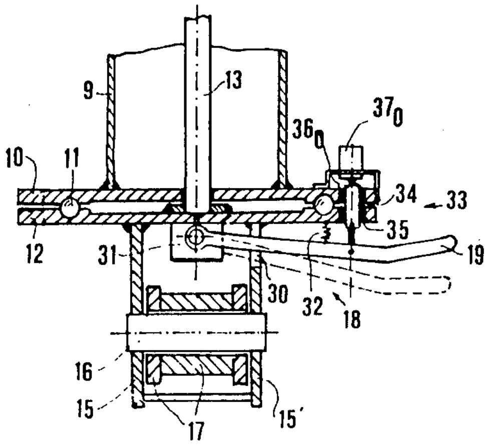
Fig.7

CHASSIS WITH SWIVEL-MOUNTED WHEEL AXLES, ESPECIALLY FOR MOBILE CRANES

BACKGROUND OF THE INVENTION

1. Field of the Invention

The present invention relates to a self-propelled vehicle or chassis with swivel-mounted wheel axles, especially for mobile cranes, having a frame which has both at its front and rear ends two wheels or pairs of wheels, of which at least the wheels or pairs of wheels located at one end of the frame are arranged on pivotable axles for steering the chassis, and the chassis having four support legs fitted with foot plates for setting on the ground and with elevating mechanisms for raising and lowering the same, each of the support legs being installed near one of the wheels or pairs of wheels located at one and/or the other end of the frame.

2. The Prior Art

Mobile cranes, especially mobile cranes used for transferring goods within port installations, are more maneuverable and economical than cranes which move on tracks. They do, however, require a roadbed which is appropriately solid and which has been properly prepared for the size and weight of the crane, and they require knowledgeable and experienced crane operators for moving and setting up the crane so as to eliminate, if possible, the danger of damage and accidents.

Often, especially in areas with little industrial development, mobile gantry cranes of conventional construction cannot be used because the freight yards are not in an appropriate condition and sufficiently experienced crane operators are not available.

It is the object of the present invention to create, especially for a mobile gantry crane, a chassis with swivel-mounted axles which, with a smaller technical input as compared to the known steerable chassis can, with a little care, be easily moved and set up in difficult terrain by unskilled crane operators without damage or accidents.

SUMMARY OF THE INVENTION

According to the present invention the chassis, which can be used with mobile cranes, includes swivel-mounted axles which are restricted to moving straight or turning on the spot and can be easily and simply positioned by hand.

The invention will be better understood by reference to the accompanying drawings taken with the following detailed discussion.

DESCRIPTION OF THE DRAWINGS

In the drawings,

FIG. 1 shows a side view of a chassis which encompasses two longitudinal members of the frame in accordance with the invention, shown in the position for setting the swivel-mounted axles;

FIG. 2 shows a front view of the chassis depicted in FIG. 1;

FIG. 5 shows a swivel-mounted pair of wheels illustrated in a front view, partially in section, with the adjusting device and the locking device;

FIG. 6 is a top view of the adjusting and locking device of the pair of wheels of FIG. 5;

FIG. 7 is an axial section through the adjusting device and locking device of the pair of wheels shown in FIG. 5.

DETAILED DESCRIPTION OF THE PREFERRED EMBODIMENTS

Figure 3:
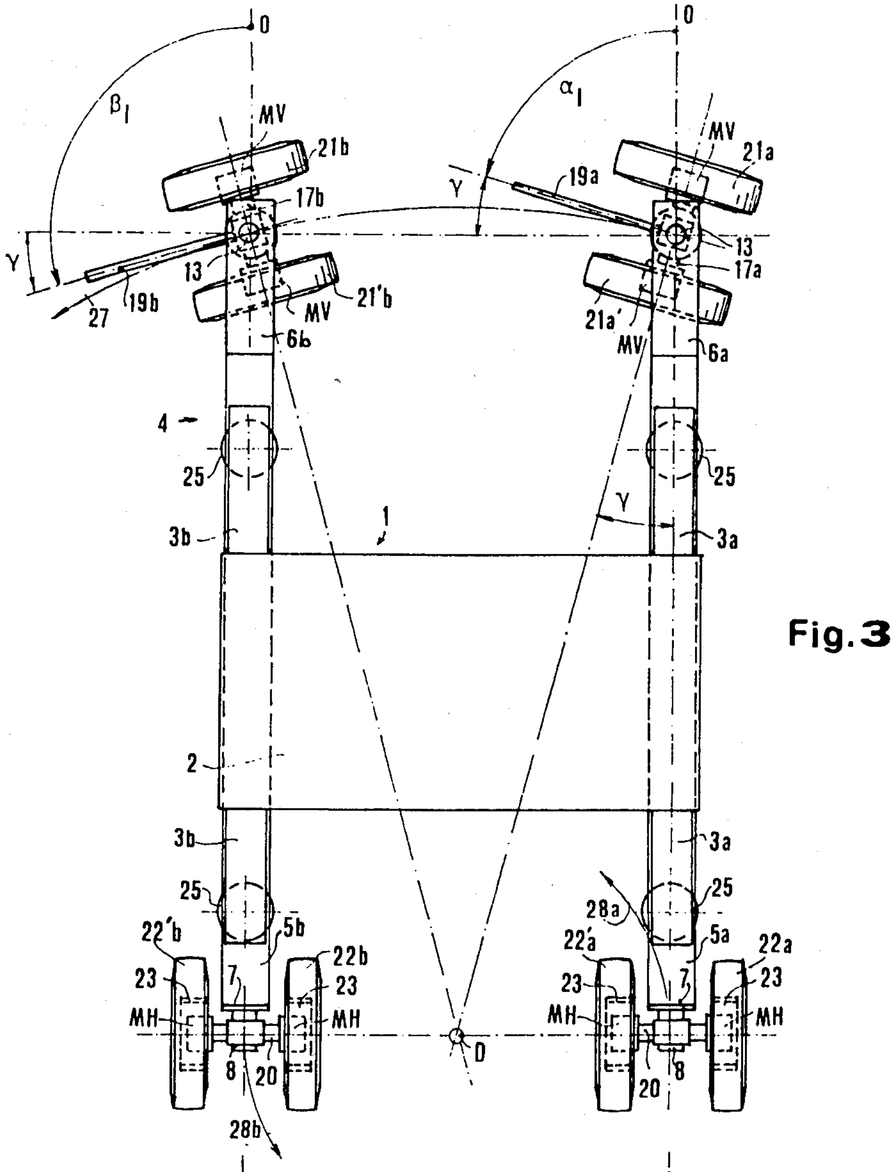
FIG. 3 shows a plan view of the chassis with pairs of front wheels driven in the same direction and set for turning on the spot.

In the chassis for a mobile gantry crane, which is shown in a side view in FIG. 1, in a front view in FIG. 2, and in a plan view in FIG. 3, the gantry 1 for the crane structure not shown is formed by the platform 2 which rests on two pairs of legs 3*a* and 3*b*. The leg pairs 3*a* and 3*b* are respectively connected to two equal and parallel long channel bars 5*a* and 5*b* which form a fixed and rigid chassis frame 4. The end portions of the long channel bars 5*a* and 5*b* respectively project in their longitudinal direction beyond the points where the leg pairs 3*a* and 3*b* of the gantry 1 are attached thereto.

The two highly loadable long channel bars 5*a* and 5*b* of the chassis frame are constructed as solid wall box girders constructed from I beams. At one end, which is usually the front end when driving, the two long channel bars 5*a* and 5*b* of the chassis frame are each fitted with a gooseneck attachment 6*a*, 6*b* which cantilevers upwards, the gooseneck being constructed in the same manner as the long channel bars of the chassis frame and each of which is carried on a wheel or pair of wheels. At the other end, i.e., the rear end, each of the long channel bars of the chassis frame 5*a* and 5*b* respectively terminate with massive stop plates 7 which in turn mount integral axle supports 8 for a rear wheel or a pair of wheels.

A hollow cylindrical spacer 9 is attached, e.g., welded, to the underside of each of the gooseneck attachments 6*a*, 6*b* which carries on the end near the ground a concentric horizontal plate 10*a*, 10*b* as the rigid bearing component for a concentric turntable 12*a*, 12*b* located therebelow and supported, e.g., by a ring of ball bearings 11. Fixedly connected to the top of each turntable 12*a*, 12*b* is a vertical axle 13 which penetrates upwardly through an opening in the plate 10*a*, 10*b* and is retained in the gooseneck attachment 6*a*, 6*b* by means of a thrust bearing 14. Attached to the underside of each turntable 12*a*, 12*b* are a pair of bearing blocks 15, 15', with the axle-housing 16 for the swivel-mounted wheel axles 17*a*, 17*b* of the front wheel or pair of wheels. For repositioning, a separate adjusting device 18*a*, 18*b* is assigned to each of the swivel-mounted wheel axles 17*a*, 17*b* which can be operated by hand and which has a lever 19*a*, 19*b* (FIG. 1), as will be described in further detail below.

Fixed wheel axles 20, which are fitted to the rear axle supports 8, are provided for the rear wheels or pairs of wheels.

The two horizontal fixed wheel axles 20 and the two horizontal swivel-mounted axles 17*a*, 17*b*, for example, each carry a pair of wheels 22*a*, 22*a*' and 22*b*, 22*b*' or 21*a*, 21*a*' and 21*b*, 21*b*', where the wheel mountings are of conventional construction and are preferably constructed with independent axles. The rear wheels 22*a*, 22*a*' and 22*b*, 22*b*', which are set on the fixed wheel axles 20, are fitted with braking mechanisms 23 indicated by the dashed lines in FIG. 2. The braking mechanisms 23 are designed so that the wheels are locked when the brakes are "at rest", i.e., deenergized, and that they can be released only by means of an energy source.

In the case of the chassis shown in FIGS. 1 through 3, an all-wheel drive is provided with a one-each wheel drive MV for each of the front wheels 21 and a wheel drive MH for each of the rear wheels 22. The two long channel bars 5*a*, 5*b* of the chassis frame are equipped with conventional support legs 24 which are located along their length in the area below where the pairs of gantry legs 3*a*, 3*b* are connected thereto, each leg being extended or retracted by means of individual elevating mechanisms 26. The elevating mechanisms 26 and the support legs 24, which are fitted with footplates 25, are so equipped and arranged that in their fully extended position the wheels will be lifted from the ground and have absolutely no contact with the ground.

The wheel driving devices MV and MH, the elevating mechanisms 26 for the support legs 24, and the power source for the braking mechanism are preferably hydraulic devices, which are well known in the technology of drives and vehicle frame construction.

Since the adjusting mechanisms 18*a*, 18*b* are manually operated, at least the forward support legs 24 are extendable so that the forward wheels or pairs of wheels will have no contact with the ground and only the turning resistance of the bearings must be overcome when the swivel-mounted wheel axles are to be repositioned (FIG. 1).

In the case of the chassis according to the invention, the swivel-mounted wheel axles can be adjusted only for moving straight ahead or for turning about a fixed spot.

Figure 4:
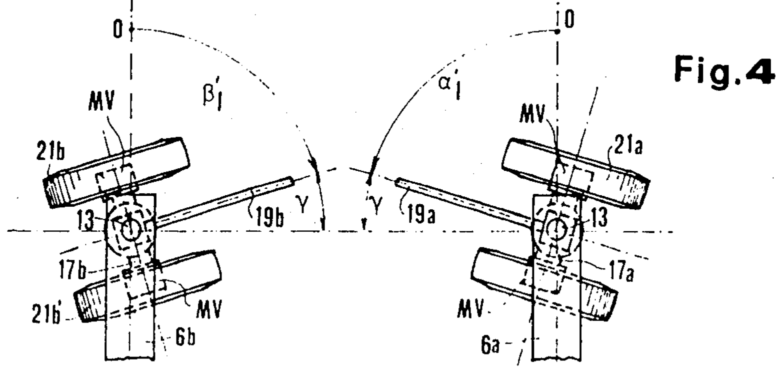
FIG. 4 shows two pairs of front wheels set for turning on the spot when the wheels are driven in opposition directions.

For driving straight ahead, the setting of the wheel axles is obvious. The fixed, as well as the swivel-mounted wheel axles, are aligned at right angles to the direction of travel, i.e., at right angles to the longitudinal central axis of the chassis, and the driven wheels are all driven in the same direction by the driving mechanism, in one direction for forward motion or in the other direction for reverse motion. In aligning the swivel-mounted wheel axles for turning the chassis about a fixed spot, however, there are generally two possibilities, which are illustrated in FIGS. 3 and 4.

As can be seen from FIG. 3, when turning about a fixed spot D, the chassis is rotated about an axis which is located at point D midway between the rear wheels or pairs of wheels and is vertical with respect to the plane of the earth. In each such case, the swivel-mounted wheel axles 17*a*, 17*b* of the front wheels or pairs of wheels must be so positioned as to be radial to the axis of rotation.

In FIG. 1 it is assumed that the levers 19*a*, 19*b* of the adjusting devices 18*a*, 18*b* of the swivel-mounted wheel axles 17*a*, 17*b* point straight ahead when positioned for moving straight ahead, i.e., starting position "0".

If the two front pairs of wheels 21*a*, 21*a'* and 21*b*, 21*b'* are always driven in the same direction by the drive mechanism, i.e., both in the direction of driving "forward" or for driving in "reverse", and if the chassis is to be turned about the spot D to the left when the driving mechanism has been set for forward drive, then, in order to properly position the swivel-mounted wheel axles 17*a*, 17*b*, the two levers 19*a*, 19*b* must be repositioned, both to the left, but to differing positioning angles, the right lever 19*a* to the positioning angle $\alpha_l = -(90° - \gamma)$ and the left lever 19*b* to the positioning angle $\beta_l = -(90° + \gamma)$, where the angle $\gamma$ is determined by the geometry of the chassis. If the chassis turns to the left (arrow 27), the right rear pair of wheels 22*a*, 22*a'* turns for forward drive (arrow 28*a*) while the left rear pair of wheels 22*b*, 22*b'* turns in the opposite direction for reverse drive (arrow 28*b*).

If the direction of drive "forward" is assigned to a turning to the right of the chassis, then, in order to properly position the swivel-mounted wheel axles 17*a*, 17*b*, the two levers 19*a*, 19*b* must both be repositioned to the right by differing positioning angles $\alpha_r = (90° + \gamma)$ and $\beta_r = (90° - \gamma)$ and the rear pair of wheels 22*b*, 22*b'* turns in the same direction as the forward pairs of wheels 21*a*, 21*a'* and 21*b*, 21*b'*, while the right rear pair of wheels 22*a*, 22*a'* turns in the opposite direction.

Thus, for turning about the spot D with the front wheels or pairs of wheels driven in the same direction, the levers 19*a*, 19*b* of the adjusting devices 18*a*, 18*b* must be repositioned in the same direction but at differing positioning angles and, for one rear wheel or pair of wheels, the wheel drive mechanism is to be switched to the opposite direction of rotation or should be put in neutral (free-wheeling).

FIG. 4 shows the two front pairs of wheels 21*a*, 21*a'* and 21*b*, 21*b'* positioned for turning the chassis about the spot D for oppositely driven pairs of wheels, wherein the chassis should turn to the left if, as in FIG. 3, the front right pair of wheels 21*a*, 21*a'* turns "forward" in the direction of travel. For proper positioning of the swivel-mounted wheel axles 17*a*, 17*b*, the two levers 19*a*, 19*b* are to be repositioned by the same positioning angle but in opposite directions, the lever 19*a*, as before in FIG. 3, to the left at the positioning angle $\alpha_l = -(90° - \gamma)$ and the lever 19*b* to the right with the positioning angle $\beta'_l = +(90° - \gamma)$. If the chassis is to turn to the right with the front pair of wheels 21*a*, 21*a'* turning as for forward driving, then the levers 19*a*, 19*b* are to be repositioned in the opposite direction, $\alpha'_r = +(90° - \gamma)$, $\beta'_r = -(90° - \gamma)$. The rear pairs of wheels 22*a*, 22*a'* and 22*b*, 22*b'* turn as described above (FIG. 3). For turning the chassis about the spot D with the front wheels or pairs of wheels driven in opposite directions, the levers 19*a*, 19*b* of the adjusting device 18*a*, 18*b* are to be repositioned in opposite directions, but at the same positioning angle and the driving mechanism for the two wheels or pairs of wheels located on one (longitudinal) side of the chassis 21*b*, 21*b'* and 22*b*, 22*b'* or 21*a*, 21*a'* and 22*a*, 22*a'* are to be reset to drive in the opposite direction or are to be free-wheeling.

Setting the direction of driving either "forward" or "reverse" is usually accomplished with a single steering lever or with two steering push buttons. It is appropriate to retain this control of direction for turning on the spot, wherein then, for instance, we obtain "forward - turn left" and "reverse - turn right". The resetting of the controls of the wheel drive mechanism necessary for turning on the spot is accomplished automatically by the positioning of the swivel-mounted wheel axles by means of the adjusting mechanism 18*a* and 18*b*. This will be referred to below.

After repositioning the swivel-mounted wheel axles 17*a*, 17*b* by means of the adjusting device 18*a*, 18*b*, they have to be sufficiently firmly fixed in the selected position.

A very simple combined positioning and locking device is shown in FIGS. 5, 6 and 7.

Since the positioning and locking devices for the two swivel-mounted wheel axles 17*a* and 17*b* are essentially the same, FIG. 5 through 7 show a designation a or b pertaining to one or the other of the swivel-mounted wheel axles only where it is necessary.

The bearing blocks 15, 15' arranged on the underside of the turntable 12 are simple steel plates, between which the axle housing 16 for the swivel-mounted wheel axles extends.

As mentioned earlier, the adjusting mechanism 18 for positioning the swivel-mounted wheel axles 17 has a lever 19, which points forward in the direction of travel when the axle position is correct for forward travel. The lever 19 is supported at one of its ends in a bearing 31, permitting vertical swiveling, located on the underside of the turntable below the vertical swivel pin 13 and projects into a vertical slot 30 in the forward bearing block 15' so that by swiveling the lever 19 in a horizontal plane the turntable 12 with the swivel-mounted wheel axle can be repositioned.

The locking device 33 has a locking pin 34 guided in a vertical hole 35 in the turntable 12, which snaps into a similar hole 36 in the fixed plate 10 thereabove, thus producing a fixed connection between the plate 10 and the turntable 12, thus locking the swivel-mounted wheel axle 17 into this position. The locking pin 34 is connected by a pivot to the lever 19, so that by raising and lowering the lever 19 the connection between the plate 10 and the turntable 12 and, thus, the positioning of the swivel-mounted wheel axle 17 can be made or broken. It is of advantage to place a spring 32 between the turntable 12 and the lever 19 which pulls the lever 19 into the locked position.

The solid plates 10*a* and 10*b* (FIG. 6) each have a second bore 36*a* or 36*b* located at the correct angular displacement from the first bore $36_o$ for the displacement selected for the swivel-mounted wheel axles (FIG. 3, FIG. 4) to fix the swivel-mounted wheel axles 17*a*, 17*b* in the correct position for turning about the spot D.

In order to position a swivel-mounted wheel axle 17 into a new orientation, it is only necessary to free the locking by pushing down on lever 19, rotating lever 19 to its new position and releasing it there for locking. The range of motion of lever 19 is best limited by stops in order to make the positioning as simple as possible. In addition, the levers 19*a* and 19*b* can be short, since an attachable handle extension is planned for attachment thereto.

Figure 8:
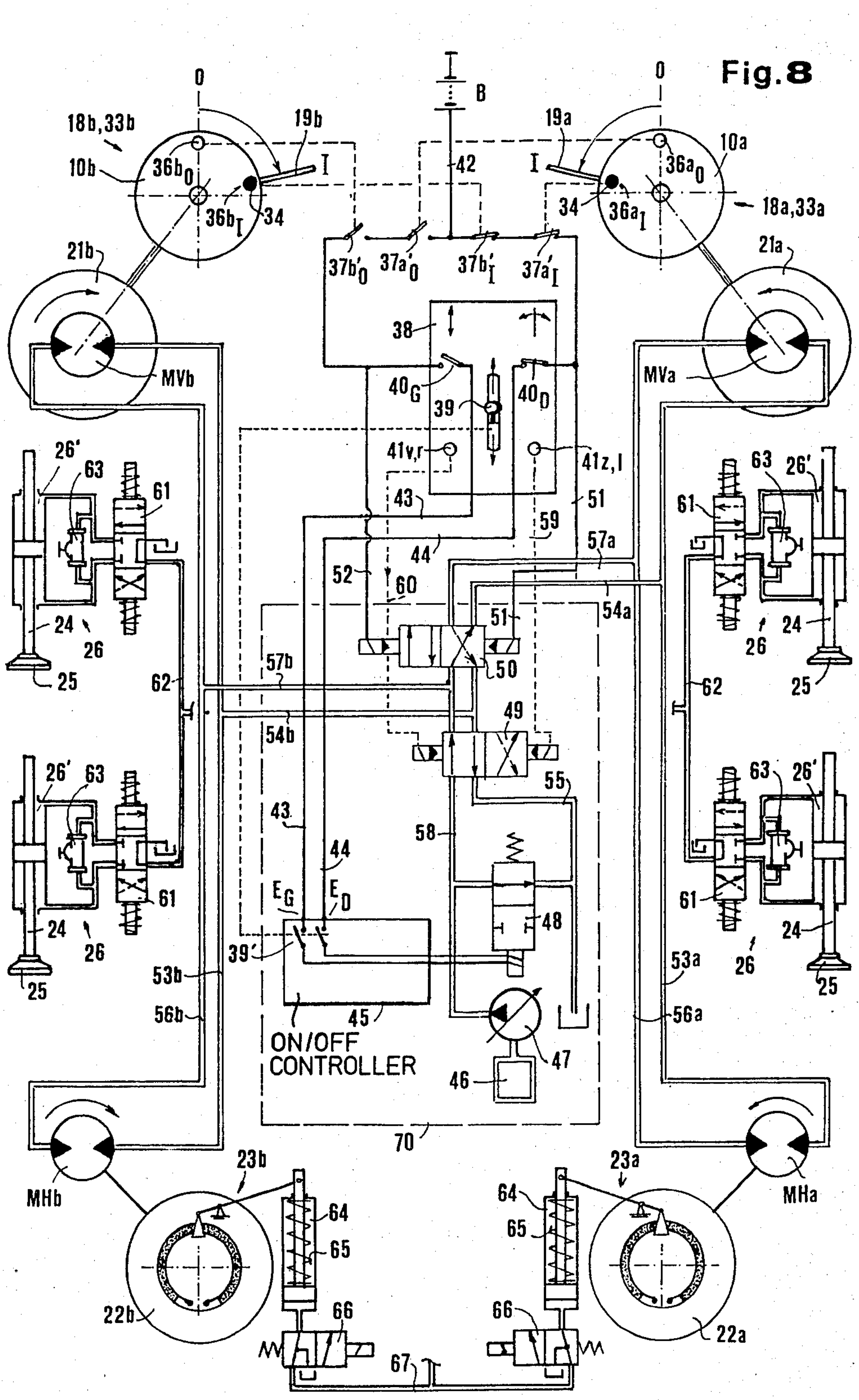
FIG. 8 is a schematic representation of the oil circuits and the control circuits of the chassis.

In order to avoid, with certainty, conditional damage occurring as a result of inadequate locking or faulty positioning such as, for example, setting one wheel axle for straight ahead travel and the other for turning on the spot, the locking devices 33*a*, 33*b* have locking detectors $37a_O$, $37a_I$, or $37b_O$, $37b_I$ at the positioning spots "O" for straight ahead travel and "I" for turning on the spot, which monitor the locking condition and are incorporated into the control circuit in such a way that the wheel drive can only be engaged when both of the swivel-mounted wheel axles 17*a* and 17*b* are positioned either for straight ahead travel or for turning on the spot and are properly locked. In the locking mechanism described above, the locking detectors 37 may be, for example, limit switches which are set on the fixed plate 10 at the bores $36_O$ and $36_I$ and which are actuated, for example—closed, by inserting the locking pin 34. A circuit for such locking detectors equipped with electrical on/off switches is shown in FIG. 8. It illustrates schematically the oil circuits and the control circuits of a chassis, for which the swivel-mounted wheel axles for the front wheels 21*a*, 21*b* have been positioned for turning on the spot by means of the adjusting and locking arrangement 18 or 33, as described above.

The wheel drives MVa, MVb and MHa, MHb for the front wheels 21*a*, 21*b* and the rear wheels 22*a*, 22*b* are hydraulic motors which are connected via the hydraulic lines 53–58 to the hydraulic pump 47, for instance with only one output side, which can be controlled and adjusted with the control handle 39 at the control panel 38.

A main valve 48 (an $\alpha$-valve) is assigned to the hydraulic pump 47 which is driven by a drive motor, for instance, a combustion motor, which in its idle position diverts the oil pressure from the oil line 58 so that with an operating hydraulic pump 47 the wheel drives MVa, MVb, MHa and MHb are turned off. In order to drive the wheels, the main valve 48 is positioned in the working position by an "ON" control signal so that the pump pressure acts upon the oil pressure line 58. The on-off controller 45 is equipped such that a start control signal can only be given when the swivel-mounted wheel axles have been properly positioned and locked, where the locking detectors $37a_O$ and $37b_O$ in the setting "O" for driving straight ahead and the locking detectors $37a_1$ and $37b_1$ in the setting "I" for turning on the spot which control the locking condition, are used as interlocks, and when used in the pairings mentioned above constitute an interlock circuit for driving straight ahead and an interlock circuit for turning on the spot.

In the practical embodiment being described (FIG. 8), when using the limit switches as locking detectors, the limit switches $37a_O'$, $37b_O'$ and the control switch $40_G$ are connected in series for driving straight ahead, for a circuit connecting one terminal of the vehicle battery B with the hot terminal $E_G$ of control mechanism 45 through the leads 42 and 43. Similarly, the limit switches $37a_I'$, $37b_I'$ and the control switch $40_D$ are connected in series for turning on the spot, providing a second circuit connecting the vehicle battery B with the "hot" terminal $E_D$ of the control mechanism 45 by through-leads 42 and 44. Thus, either one or the other of the terminals $E_G$ or $E_D$ is energized when all of the switches in its circuit are closed, as shown in FIG. 8 for turning on the spot. The control device 45 will send an "ON" control impulse to the main valve 48 only when one of the two terminals $E_G$ or $E_D$ is energized. The control handle 39, for example, can serve as the actuating mechanism for the on/off controller 45, where, with the control handle 39 in the "OFF" position (which applies simultaneously to all of the wheel drives MVa, MVb, MHa, MHb), the main valve 48 is in the "idle" or deenergized position. By moving the control handle 39 out of the "OFF" position in order to drive, the on/off controller 45 provides an "ON" signal to the main valve 48, which is shown schematically in FIG. 8, by the closing of the switch 39' with the control handle 39 of the on/off controller 45.

When positioning the swivel-mounted wheel axles corresponding to FIG. 4, as mentioned earlier, the wheels 21*a*, 21*b* located on one side of the carriage are to be driven in the opposite direction with respect to the wheels 21*b*, 22*b* located on the other side of the carriage in order to turn the carriage on the spot. Correspondingly, in the practical embodiment shown in FIG. 8, the wheel drives on the left, MVb and MHb, can be connected with the hydraulic pressure line 58 and the return line 55 through the hydraulic lines 56*b*, 57*b* and 53*b*, 54*b* through the first 4-port 2-way valve 49, and the right-side wheel drives MVa and MHa can be connected to the hydraulic supply line 58 and the return line 55 through the hydraulic lines 56*a*, 57*a* and 53*a*, 54*a* via the second 4-port 2-way valve 50 and the first 4-port 2-way valve 49 (in series). The first 4-port 2-way valve 49 is positioned from the control panel 38. For this purpose, for instance, two push buttons 41v,r and 41z,l are provided, through whose operation the 4-port 2-way valve 49 can be brought into one or the other of its two positions, as indicated by the dashed operating lines 59 and 60 in FIG. 8. The designations "v, r" and "z, l" mean that turning to the right on the spot "r" has been assigned to forward "v" and that turning to the left "l" on the spot has been assigned to reverse "r".

The 4-port 2-way valve 50, which serves to reverse the direction of rotation of the wheel drives MVa and MHa for turning on the spot, is automatically positioned into one position or the other through the positioning of the swivel-mounted wheel axles, by the locking detectors $37a_O$, $37a_I$, $37b_O$, $37b_I$ (FIGS. 5–7), i.e., by the switch position of the limit switches $37a_O'$, $37b_O'$ and $37a_I'$, $37b_I'$ (FIG. 8) and is connected via leads 51 and 52 to the circuits containing the limit switches $37a_I'$ and $37b_I'$ and, respectively, the limit switches $37a_O'$ and $37b_O'$. With the swivel-mounted wheel axles positioned as shown in FIG. 8 for turning about the spot D, the limit switches $37a_I'$ and $37b_I'$ are closed and accordingly the second 4-port 2-way valve 50 is positioned to reverse the direction of rotation of the right-side wheel drives MVa and MVb and the chassis will turn about the spot D to the right when the push button 41v, r is actuated and will turn to the left when the push button 41z, 1 is actuated. With the swivel-mounted wheel axles positioned for moving straight ahead, position O in FIG. 8, the limit switches $37a_O'$ and $37b_O'$ will be closed and, thus, the second 4-port 2-way valve will be placed in its other position, which has not been shown in FIG. 8, and all four wheel drives MVa, MVb, MHa, MHb will turn in the same direction for moving forward or backward, depending on whether push button 41v,r or 41z,l has been actuated.

When positioning the swivel-mounted wheel axles as shown in FIG. 3, an appropriately adapted drive control is required, which can be assembled without difficulty by means of, for example, directional control valves. If, for instance, when turning on the spot, the rear wheels or pairs of wheels 22*a*, 22*b* should freewheel, directional control valves may be provided for the particular wheel drives which, during the freewheeling, connect with each other the hydraulic lines of the wheel drive involved. The development of the control installation for the wheel drives, which is enclosed within block 70 of FIG. 8, is determined primarily by the particular drive scheme chosen, and in each case it can be modified with a view to achieving easier operability, safety, cost effectiveness and maintainability.

In order to drive the chassis, the support legs 24 are fully retracted. To position the swivel-mounted wheel axles, the chassis is raised off the ground by extending the support legs located there until the wheels no longer contact the ground, at least at that end where these wheel axles are mounted. Upon arriving at the intended station and while the crane is not loaded, the support legs are lowered until they contact the ground in order to achieve adequate stability when loaded. The elevating mechanisms 26 of the support legs 24 are generally double-acting hydraulic cylinders 26', whose hydraulic lines can be connected to the pressure oil line 62 by means of a directional control line 61, such as a 4-port 3-way control valve. The positioning of the directional control valve 61 is appropriately accomplished from the control panel 38, for example by actuating the corresponding push button. Instead of or in addition to this, a separate hand switch may be provided at each support leg 26 in order to individually adjust the support legs 24. In order to lower the support legs 24 at the intended station, the hydraulic lines of the double-acting hydraulic cylinders are connected with one another through a connection which includes a hydraulic cock 63 having a small cross-sectional area for flow so that the support leg 24, as a result of its weight, will slowly drop downward until the foot plates 25 touch the ground after the cock 63 has been opened manually. After the cock 63 has been closed, the support leg 24 remains in this position and can carry the forces which occur when the crane is loaded.

Conventional hydraulic devices, especially single-acting hydraulic cylinders 64, are used as the power source for releasing the brakes 23 (FIG. 2) with the construction as shown in FIG. 8. These can be connected to the hydraulic line 67 by means of the electro-hydraulic valve 66 in order to release the braking mechanism 23*a*, 23*b* which had been kept in the locked position by the brake springs 65. Positioning of the valves 66 also is controlled from the control panel 38.

I claim:

1. A self-propelled vehicle for movably supporting heavy equipment such as a gantry crane, said vehicle being movable straight ahead, straight behind or to the left or right about a fixed spot, said vehicle including:

a chassis frame upon which the heavy equipment can be mounted, said chassis frame having a front end and a rear end and defining a longitudinal dimension and a transverse dimension, two rear wheel assemblies attached to the rear end of said chassis frame, each rear wheel assembly including at least one rotatable wheel extending beneath the chassis frame so as to contact the ground therebelow, and each rear wheel assembly including a drive means for rotating each wheel thereof, two front wheel assemblies attached to the front end of said chassis frame, each front wheel assembly including at least one rotatable wheel extending beneath the chassis frame so as to contact the ground therebelow, each front wheel assembly including a drive means for rotating the wheel(s) thereof, each front wheel assembly being swivelable about a vertical axis and also including:

a manually operable adjusting means for causing the wheel assembly to swivel and change the angular orientation of the wheel(s) thereof with respect to the longitudinal dimension of the chassis frame, a locking means for fixedly positioning the swivel positioning of the wheel assembly once manually adjusted to its desired orientation, first locking detectors to detect when the wheel assembly has been locked in a swivel positioning such that the wheel(s) thereof are directed in parallel with the longitudinal dimension of the chassis frame to result in straight ahead or straight behind movement of the vehicle, and second locking detectors to detect when the wheel assembly has been locked in a swivel positioning such that the wheel(s) thereof are directed at an angle to the longitudinal dimension of the chassis frame to result in left or right movement of the vehicle about a fixed spot, four adjustable support means attached to said chassis frame, each adjustable support means being located near a respective wheel assembly, each adjustable support means including an extendable support leg with foot plate which is extendable beneath the chassis frame to lift the wheel(s) of the adjacent wheel assembly off the ground and an elevating mechanism for adjusting the degree of extension of the support leg, and first and second electrical control circuits respectively connected to said first and second locking detectors, to control the operation of said drive means of said wheel assemblies.

2. The self-propelled vehicle as defined in claim 1 wherein the drive means of each wheel assembly is a hydraulic motor, wherein said vehicle includes a hydraulic fluid supply system connected to each of said hydraulic motors, and wherein said first and second electrical control circuits are connected to control the operation of said hydraulic fluid supply system.

3. The self-propelled vehicle as defined in claim 2 wherein said hydraulic fluid supply system includes a fluid pump, a main control valve and fluid lines connected to each of said hydraulic motors, said first and second electrical control circuits being connected to operate said main control valve.

4. The self-propelled vehicle as defined in claim 3 wherein said vehicle includes a control panel mounted thereon which includes a manually operable control handle, wherein said first and second control circuits are connected to an on/off controller, which in turn is connected to operate said main control valve, and wherein said control handle is electrically connected to operate said on/off controller.

5. The self-propelled vehicle as defined in claim 4 wherein said two front wheel assemblies provide a left front wheel assembly and a right front wheel assembly, wherein said two rear wheel assemblies provide a left rear wheel assembly and a right rear wheel assembly, wherein said hydraulic fluid supply system includes a first 4-port, 2-way valve and a second 4-port, 2-way valve, said first 4-part, 2-way valve being connected by said fluid lines to the hydraulic motors of said right front and right rear wheel assemblies to simultaneously control the direction of rotation of the wheel(s) thereof, and the second 4-part, 2-way valve being connected by said fluid lines to the hydraulic motors of said left front and left rear wheel assemblies to simultaneously control the direction of rotation of the wheel(s) thereof.

6. The self-propelled vehicle as defined in claim 1 wherein said rear wheel assemblies are non-swivelable and are fixedly attached to said chassis frame such that the wheel(s) thereof are directed parallel to the longitudinal dimension of said chassis frame.

7. The self-propelled vehicle as defined in claim 1 wherein each front wheel assembly includes a horizontally oriented plate fixedly mounted below said chassis frame, a horizontally oriented turntable rotatably positioned therebelow, ball bearing means located between said plate and said turntable, and a bearing block means mounted to said turntable, the bearing block mounting the associated wheel(s).

8. The self-propelled vehicle as defined in claim 7 wherein each said plate includes a hole therein, and each turntable includes an axle which extends from its upper side through the hole in the plate.

9. The self-propelled vehicle as defined in claim 8 wherein the adjusting means of each front wheel assembly includes a lever which is pivotably attached to the lower side of the turntable at a point beneath the axle thereof.

10. The self-propelled vehicle as defined in claim 9 wherein each said plate includes slots therein which correspond with straight ahead, straight behind and left and right turning of said vehicle about a spot, wherein each turntable includes a slot therein which can be aligned with the slots in the associated plate, and wherein the associated lever is vertically pivotable and includes a pin along its length which can extend through the slot in said turntable and an aligned slot in said plate.

11. The self-propelled vehicle as defined in claim 10 wherein a spring means is connected between the lever of each front wheel assembly and the associated turntable to bias the pin of each lever upwardly within the slot of the associated turntable and upwardly within an aligned slot of the associated plate.

12. The self-propelled vehicle as defined in claim 10 wherein slots are provided in the plate of each front wheel assembly to enable each front wheel assembly to be locked in a swivel positioning such that the vehicle will move about a spot located halfway between the rear wheel assemblies thereof.

13. The self-propelled vehicle as defined in claim 1 wherein the elevating mechanism of each adjustable support means comprises a double-acting hydraulic cylinder.

14. The self-propelled vehicle as defined in claim 1 wherein each of said two rear wheel assemblies includes a brake mechanism, each brake mechanism including a brake shoe, a spring means for causing the brake shoe to contact the associated wheel(s), and control means capable of counteracting the effect of the associated spring means.

15. The self-propelled vehicle as defined in claim 1 wherein each of said front and rear wheel assemblies includes a pair of rotatable wheels.

16. The self-propelled vehicle as defined in claim 1 wherein said chassis frame includes two parallel beams.

17. The self-propelled vehicle as defined in claim 16 wherein a pair of legs are mounted on each of said parallel beams, and wherein a platform on which the heavy equipment can be positioned is extended between said pairs of legs.

* * * * *